United States Patent
Papakonstantopoulos et al.

(10) Patent No.: US 12,420,507 B2
(45) Date of Patent: Sep. 23, 2025

(54) SELF-SEALING PNEUMATIC TIRE WITH NOISE SUPPRESSION CHARACTERISTICS

(71) Applicant: THE GOODYEAR TIRE & RUBBER COMPANY, Akron, OH (US)

(72) Inventors: George Jim Papakonstantopoulos, Medina, OH (US); Michael Lawrence Gersman, Cleveland, OH (US); Robin Lamgaday, Copley, OH (US)

(73) Assignee: The Goodyear Tire & Rubber Company, Akron, OH (US)

( * ) Notice: Subject to any disclaimer, the term of this patent is extended or adjusted under 35 U.S.C. 154(b) by 214 days.

(21) Appl. No.: 17/947,506

(22) Filed: Sep. 19, 2022

(65) Prior Publication Data

US 2023/0104547 A1     Apr. 6, 2023

Related U.S. Application Data

(60) Provisional application No. 63/252,677, filed on Oct. 6, 2021.

(51) Int. Cl.
| | |
|---|---|
| *B60C 19/12* | (2006.01) |
| *B29D 30/06* | (2006.01) |
| *B60C 19/00* | (2006.01) |
| *B60C 5/00* | (2006.01) |

(52) U.S. Cl.
CPC ........ B29D 30/0685 (2013.01); B60C 19/002 (2013.01); *B29D 2030/0686* (2013.01); *B60C 5/002* (2013.01)

(58) Field of Classification Search
CPC .................. B60C 19/12; B60C 19/122; B60C 2009/0269; B60C 5/002
See application file for complete search history.

(56) References Cited

U.S. PATENT DOCUMENTS

| | | | |
|---|---|---|---|
| 1,419,470 | A | 6/1922 | Reasoner et al. |
| 1,601,013 | A | 9/1926 | Wildman et al. |
| 1,977,281 | A | 10/1934 | Knowlton |
| 2,877,819 | A | 3/1959 | Gibbs |
| 3,048,509 | A | 8/1962 | Sweet et al. |

(Continued)

FOREIGN PATENT DOCUMENTS

| | | | |
|---|---|---|---|
| EP | 3354702 A1 | 8/2018 | |
| GB | 2146959 A  * | 5/1985 | ........... B29C 73/163 |

(Continued)

OTHER PUBLICATIONS

European Search Report dated Feb. 24, 2023 for European Patent Application No. EP22199378 which is the European counterpart to the subject patent application.

*Primary Examiner* — Justin R Fischer
(74) *Attorney, Agent, or Firm* — Alvin T. Rockhill

(57) ABSTRACT

The pneumatic tires of this invention are of the tubeless type, are capable of self-sealing punctures made therein, and generate a low level of noise during use on a vehicle. These tires have a sealant/noise reduction layer which is disposed inwardly from the supporting carcass and which is typically the innermost layer of the tire. The sealant/noise reduction layer is comprised of a dispersed phase and a continuous phase, wherein the dispersed phase is comprised of a sealant material, and wherein the continuous phase is comprised of a foamed polymeric material.

18 Claims, 1 Drawing Sheet

(56) References Cited

U.S. PATENT DOCUMENTS

| | | |
|---|---|---|
| 4,089,360 A | 5/1978 | Bohm |
| 4,140,167 A | 2/1979 | Bohm et al. |
| 4,228,839 A | 10/1980 | Bohm et al. |
| 4,426,468 A | 1/1984 | Orum et al. |
| 4,913,209 A | 4/1990 | Hong et al. |
| 5,085,942 A | 2/1992 | Hong et al. |
| 5,295,525 A | 3/1994 | Sanda, Jr. |
| 6,837,287 B2 | 1/2005 | Smith, Sr. et al. |
| 8,221,849 B2 | 7/2012 | Naito |
| 8,360,122 B2 | 1/2013 | Wilson |
| 9,427,918 B2 | 8/2016 | Son et al. |
| 9,677,025 B2 | 6/2017 | Voge et al. |
| 9,802,446 B2 | 10/2017 | Dahlke et al. |
| 10,730,255 B2 | 8/2020 | Barjon |
| 2006/0016534 A1* | 1/2006 | Peyron .................. B60C 13/001 152/450 |
| 2022/0297477 A1* | 9/2022 | Fiorenza .................... B60C 5/14 |

FOREIGN PATENT DOCUMENTS

| | | |
|---|---|---|
| JP | H06270283 A | 8/1994 |
| WO | 2021140702 A1 | 7/2021 |

\* cited by examiner

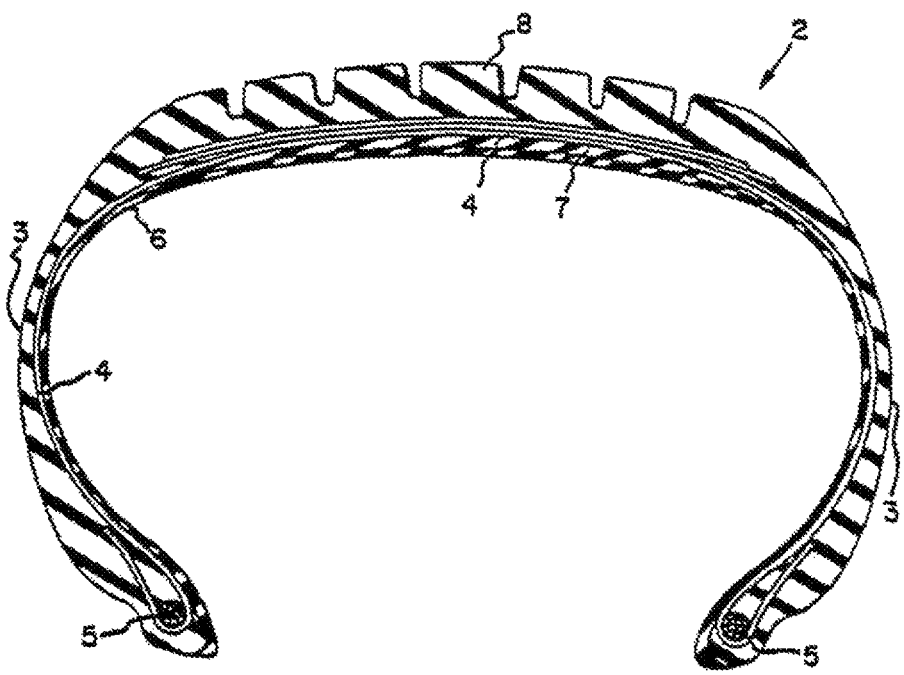

SELF-SEALING PNEUMATIC TIRE WITH NOISE SUPPRESSION CHARACTERISTICS

This application claims benefit of U.S. Provisional Patent Application Ser. No. 63/252,677, filed on Oct. 6, 2021. The teachings of U.S. Provisional Patent Application Ser. No. 63/252,677 are incorporated herein by reference in their entirety.

FIELD OF THE INVENTION

This invention relates to self-sealing pneumatic tires of the tubeless type which include a foam component for noise reduction. A unique method for easily manufacturing such tires using conventional tire building equipment is also disclosed. These tires can also be manufactured to a high degree of uniformity to achieve excellent balance characteristics.

BACKGROUND OF THE INVENTION

Puncture sealing tires are designed to retard or prevent the loss of air and consequential deflation after the tire has been punctured with a sharp object, such as a nail, screw, or another object which is capable of piercing through the tire. Pneumatic tires with puncture sealing capabilities have been described in the literature since at least the first part of the twentieth century (see U.S. Pat. Nos. 1,419,470, 1,601,013, and 1,977,281). Such early self-sealing tires were of a relatively simple design that generally included an unvulcanized layer of rubber which would theoretically flow into the puncture and seal it so as to prevent air loss. However, in actual practice such self-sealing tires were not very effective and consequently were of limited value.

Over the years better puncture sealing tires have been developed which allow for the tire to provide longer service after being punctured. In many cases, this provides for the continued use of the tire until it can be driven to a more convenient location for it to be repaired or replaced. For instance, it is highly desirable if the vehicle on which the tire is installed can be driven to a garage or a tire service center for repair rather than being required to change the tire on a busy road, under inclement weather conditions, or in a less than desirable neighborhood. In any case, over time more and more sophisticated tire constructions, sealant compositions, and methods for manufacturing self-sealing tires have been developed. In most of these designs a sealant material is encased or encapsulated in between layers of the tire. For example, U.S. Pat. No. 2,877,819 discloses a unitary tubeless pneumatic tire, comprising a hollow casing of fabric reinforced vulcanized, rubber-like elastic material and including a circumferential tread portion of substantial width and opposite sidewalls extending radially inwardly therefrom, and an annular puncture-sealing body of substantial width on the inner periphery of said casing in laterally centered relation with respect to said tread portion and sidewalls, said body including radially inner and outer walls of rubber-like material integrally connected at laterally spaced peripheral side portions of the body and said outer wall being integrally connected at laterally spaced peripheral side portions of the body and said outer wall being integrally cured to the elastic material of said fabric reinforced casing, said body having web portions integrally connecting between said inner and outer walls thereof defining a plurality of separate calls completely around the body, and said cells containing puncture-sealing material, said web portions being uniformly relatively thin, whereby said cellular body between said inner and outer walls thereof is predominantly puncture sealing material so that a puncturing object penetrating the tread portion of said casing and said body at substantially any point must pass through sufficient said puncture sealing material to seal against escape of inflation air through the puncture made by the puncturing object.

U.S. Pat. No. 3,048,509 discloses a laminated puncture sealing strip for pneumatic tires comprising a plurality of superposed sealing sheets that are not more than about one-tenth inch or less than about one-twentieth inch in thickness and that are composed of a soft sticky unvulcanized synthetic rubber sealing composition comprising a copolymer of 1,3-butadiene and styrene which contains at least 50% by weight of the diene combined with 35 to 115 parts by weight of softening and tackifying agents per 100 parts of the copolymer and with from 35 to 65 parts by weight of a pigment per 100 parts of the copolymer, said softening and tackifying agents and pigments being so proportioned that said sealing composition has a plasticity of from 20 to 35 as measured on a Neodoptifa-Hoekstra plastometer, and means for restricting flow of the sealing composition and for protecting the same against deterioration comprising separating and covering sheets alternating with the sealing sheets, said separating and covering sheets being thinner than said sealing sheets and being composed mainly of a vulcanized rubber compound the principal rubbery component of which is selected from the group consisting of a polymer of chloroprene and styrene-butadiene rubbers than contain at least 50% by weight of the diene, said rubber compound being substantially free from sulfur and migratory curing agents.

U.S. Pat. No. 4,089,360 discloses a pneumatic tire having a laminate as an abrasion gum strip or an innerliner wherein said laminate is comprised of at least two groups of layers with each group having at least one layer and each layer of said laminate comprising a rubber compound having an unsaturated, amorphous polymer selected from the group consisting of natural rubber and synthetic rubber and each layer having sulfur and sulfur cure accelerators so that said layers will vulcanize when exposed to a subsequent vulcanization treatment, said laminate manufactured by the steps comprising providing at least one layer of a first group with a component selected from the group consisting of paradichlorobenzene and the thioetherpolythiols; providing at least one layer of a second group with components selected from the group consisting of 2,6-di-t-butyl-p-cresol; phenyl beta-naphthylamine; 4,4' thiobis (6-t-butyl-m-cresol); N-(1,3-dimethylbutyl) N' phenyl-p-phenylene diamine; syn-di-betanaphthyl-p-phenylene diamine; and aromatic oils; said components yielding different degrees of cross-linkage in said layers when said layers are subjected to irradiation; assembling at least one of said layers from each said group into contiguous relationship to form a laminate; subjecting said laminate to irradiation so that at least two of said layers are cross-linked to a different degree; assembling said laminate into said tire and vulcanizing said tire.

U.S. Pat. No. 4,140,167 discloses a pneumatic tire comprising as one of its rubber elements a laminate comprising at least five layers of rubber compounds produced by providing at least two outer layers with a desensitizing agent which retards cross-linkage when subjected to irradiation, providing two inner layers of said laminate with a sensitizing agent which promotes cross-linkage when subject to irradiation, providing a middle layer located between said sensitized layers with a material which degrades when exposed to irradiation, assembling said laminate with said middle layer located between the two sensitized layers and the one of said desensitized layers located outside of each of said sensitized layers, subjecting said laminate to irradiation so that said layers are differentially cross-linked with said sensitized layers being cross-linked to a greater degree than said desensitized layers and said middle layer being degraded to yield a soft product, assembling said laminate into said tire and vulcanizing said tire. The degraded polymeric material utilized in such tires can be polyisobutylene, copolymers containing polyisobutylene, or polyethylene oxide, and the cross-linked polymeric material can be natural rubber, copolymers of butadiene and styrene and halogenated butyl rubber.

U.S. Pat. No. 4,228,839 discloses a self-sealing pneumatic tire comprising an annular road-engaging tread surface, two sidewalls each connecting a side of said tread surface to an annular bead, reinforcing body plies extending from one bead to the other through the sidewalls and tread and a puncture-sealant layer located in the crown area of said tire radially inward of said reinforcing body plies, said puncture-sealant layer comprising a blend of a first polymeric material that degrades on exposure to irradiation and a second polymeric material that crosslinks on exposure to irradiation, vulcanization temperatures or both to form an elastic matrix for said first polymeric material, said tire manufactured by the steps comprising providing a layer comprised of blended rubber compound with said blend of said first and second polymeric materials, assembling said layer into an unvulcanized tire as its innermost layer in the crown area, vulcanizing said tire, and subsequently irradiating said tire to degrade said first polymeric material whereby said first polymeric material forms a tacky material in said second crosslinked polymeric material which acts as an elastic matrix for said first polymeric material, whereby said layer with said polymeric material combination has puncture sealing properties. In these tires, the first polymeric material can be polyisobutylene or a copolymer of polyisobutylene and the second polymeric material can be a halogenated butyl rubber, an ethylene propylene terpolymer, polybutadiene rubber, a copolymer of styrene and butadiene, a block copolymer, a butadiene acrylonitrile copolymer, natural rubber, polyisoprene, or neoprene.

U.S. Pat. No. 4,426,468 describes a self-sealing composition for a tire based on crosslinked butyl rubber having a very high molecular weight. U.S. Pat. No. 4,426,468 more specifically describes a butyl rubber based sealant composition, the butyl rubber constituent of which is present only in the form of a copolymer having a viscosity average molecular weight in excess of 100,000, comprising the reaction product of said butyl rubber, a curing system including a cross-linking agent selected from the group consisting of at least 2 parts by weight of a quinoid cross-linking agent per hundred parts butyl rubber and at least 5 parts by weight of a phenolic cross-linking agent per hundred parts butyl rubber, and at least one tackifier compatible with butyl rubber, and a filler material, the composition being compounded such that it has a tensile strength of at least 30 psi, an elongation of at least 600% and a cross-link density such that its swell ratio in toluene is between 12 and 40. However, butyl rubbers have the drawback of exhibiting a high level of hysteresis over a broad temperature range which increased the rolling resistance of tires and is detrimental of fuel economy.

As an alternative to butyl rubbers self-sealing compositions for tires can also be made using unsaturated diene elastomers, including natural rubber. Such compositions are described in U.S. Pat. Nos. 4,913,209, 5,085,942, and 5,295,525. These compositions are characterized by the combined presence of a high content of hydrocarbon resin as tackifier, always greater than 100 parts by weight per hundred parts. In addition, a large amount of liquid elastomer gives a high fluidity to the composition which is a source of other drawbacks, in particular a risk of the self-sealing composition flowing during use at relatively high temperature (typically above 60° C.) frequently encountered during the use of the tires in certain geographical regions.

U.S. Pat. No. 6,837,287 describes a method of manufacturing a pneumatic rubber tire having an outer circumferential tread, a supporting carcass therefore, and an inner liner disposed inwardly from said supporting carcass, containing a puncture sealant layer positioned between said inner liner and said carcass, the steps of which comprise, based upon parts by weight per 100 parts by weight uncured butyl rubber (phr): (A) providing a butyl rubber-based rubber composition comprised of: (1) 100 phr of uncured star branched butyl rubber, (2) about 1 to about 35 phr of a particulate precured rubber, selected from resin-cured butyl rubber and/or sulfur-cured diene-based rubber, homogeneously dispersed in said uncured butyl rubber, and (3) about 1 to about 16 phr of organoperoxide; (B) assembling said butyl rubber based rubber composition as a layer into an unvulcanized rubber tire between said carcass and said innerliner during the tire building process; and (C) shaping and curing said rubber tire at a temperature in a range of about 130° C. to about 170° C. for a sufficient period time to partially depolymerize said uncured butyl rubber in said butyl rubber-based rubber composition layer, wherein said particulate precured rubber substantially remains in its pre-cured condition as a particulate dispersion within said partially depolymerized butyl rubber.

U.S. Pat. No. 8,221,849 discloses a method of producing a self-sealing pneumatic tire comprising the steps of: injecting a viscous sealant material onto an internal surface of a vulcanization molded pneumatic tire; rotating the pneumatic tire around a tire axis while forming the sealant material into a sealant layer diffused in a sheet form by centrifugal force, injecting a cover material comprising an unhardened rubber-based material or a resin-based material onto the internal surface of the sealant layer; rotating the pneumatic tire around the tire axis while forming the cover material into a cover sheet layer diffused in a sheet form by centrifugal force; and hardening the cover sheet layer by irradiating with an electron beam, infrared rays, ultraviolet rays, or ultrasonic waves.

U.S. Pat. No. 8,360,122 describes a tire sealant material composition comprising at least one non-halogenated butyl rubber, and 2,2'-dibenzamido-diphenyldisulfide, the sealant material composition having a viscosity that permits the sealant material composition to be incorporated into a tire during a tire building process and to degrade to a lower viscosity that permits the resulting degraded sealant material composition to flow into and seal a puncture in a tire.

U.S. Pat. No. 9,427,918 discloses a color sealant composition for a tire, comprising: 100 parts by weight of a raw rubber, 10 to 60 parts by weight of surface modified silica prepared by placing silica at 300° C. to 500° C. for 30 minutes to 3 hours, 0.05 to 5 parts by weight of pigment, 40 to 100 parts by weight of polybutene having a number average molecular weight of 1,000 to 1,500, 60 to 300 parts by weight of polybutene having a number average molecular weight of 2,000 to 3,000, and 5 to 15 parts by weight of peroxide. The raw rubber in this tire sealant composition can be natural rubber, butyl rubber, or a blend of natural rubber and butyl rubber.

U.S. Pat. No. 9,677,025 describes an inflatable article comprising a puncture-resistant layer, said layer comprising an elastomer composition having a self-sealing property, wherein the composition comprises: a blend of at least two solid elastomers, a polybutadiene or butadiene copolymer elastomer, referred to as "elastomer A", and a natural rubber or synthetic polyisoprene elastomer, referred to as "elastomer B", the elastomer A: elastomer B ratio by weight being within a range from 10:90 to 90:10; between 30 phr and 90 phr of a hydrocarbon resin; and from 0 to less than 30 phr of filler.

U.S. Pat. No. 9,802,446 discloses a pneumatic vehicle tire comprising a tread, an inner layer, and a tire sealant disposed upon the inner layer and opposite the tread; wherein the tire sealant comprises expanded solids comprising expandable graphene structures and microspheres; wherein the expanded solids are incorporated into the tire sealant in an amount of from 1 weight percent to 20 weight percent and, wherein the tire sealant provides sealing by flowing into a defect site penetrating the tread and the inner layer.

U.S. Pat. No. 10,730,255 describes a method of applying a rubber-based self-sealing composition on an inner surface of a tire casing, comprising the steps of: introducing a non-crosslinked self-sealing composition into an inlet of an extrusion device; adjusting speed and temperature conditions of the extrusion device so that, at an application nozzle forming an outlet die of said extrusion device, the self-sealing composition is crosslinked, and bringing the application nozzle close to the inner surface of said casing previously set in relative motion with respect to the application nozzle, and depositing an extruded and crosslinked bead having a given width and profile directly on said internal surface of the casing; wherein the extrusion device includes an assembly comprising a screw rotated in a barrel, the extrusion device further including a duct positioning downstream of the assembly that opens into the application nozzle; wherein the extrusion device includes a plurality of zones, and the method further includes increasing the temperature of the composition in a first zone to a set point temperature between 140° C. and 220° C. during a first period of time, maintaining the temperature at the set point temperature in a second zone for a second period of time, and increasing the temperature in a third zone for a third period of time, wherein the third period of time is shorter relative to the second period of time; wherein the third zone includes the duct and the application nozzle.

Many additional methods, sealants and tire constructions have been suggested for puncture sealant pneumatic tires. However, all of these ideas have had certain drawbacks. For example, the use of fluid puncture sealant coatings which seal by flowing into the puncture hole are frequently unsuccessful primarily because sealant coatings may flow excessively and thus tend to cause the tire to become out of balance. In other cases the sealant coating is not operable or effective over a wide temperature range extending from hot summer to cold winter conditions. Central cores of cellular material which will physically maintain the shape of the tire when punctured can place a restriction on the maximum speed of a vehicle on which they are used because of potential breakdown or destruction of the cells caused by the effects of heat and distortion. More complicated structures wherein the sealant material is encased in a vulcanized material are usually expensive to manufacture and can also create balance and suspension problems due to the additional weight required in the tire.

Puncture sealing tires can be built wherein a layer of degraded rubber which is tacky or gummy (of low viscosity) is assembled into the unvulcanized tire. This method of construction is usually only possible on a commercial basis when the degraded layer of rubber is laminated with another undegraded layer which permits its handling during the tire building procedure. This is because the tacky, sticky nature and lack of strength in degraded rubber make it very difficult to handle alone without additional support and a barrier to keep it from sticking to a tire building machine or curing apparatus. By laminating the degraded rubber layer between two or more undegraded rubber layers it is capable of retaining its structural integrity during the tire building and vulcanization process wherein high pressures are applied to the tire which would displace the degraded rubber layer from its desired location if not laminated. Such a lamination procedure adds greatly to the cost of building a tire. Thus, such lamination procedures have not been widely accepted on a commercial basis for building puncture sealing pneumatic tires.

The most common commercial approach currently being used in manufacturing self-sealing tires is to build a layer of degradable material which can be easily handled into the tire. This layer of degradable material is sandwiched between other layers of the tire. In many cases it will be positioned between two layers of innerliner or between the innerliner and the supporting carcass of the tire. In any case, this degradable material breaks down at the elevated temperatures which are employed during the vulcanization of the tire into a low viscosity, tacky material. This approach greatly facilitates tire manufacturing by eliminating the need to handle sticky materials during the tire building procedure.

Today, challenges still remain in the field of manufacturing highly effective self-sealing tires without compromising tire uniformity and performance characteristics. For instance, off-gassing results as the sealant material is degraded during vulcanization into a low viscosity material having the needed characteristics for a sealant. This off-gassing frequently results in an undesirable expansion of the innerliner in cases where the sealant layer is situated between the innerliner and the supporting carcass or between two layers of innerliner. This expansion of the innerliner causes it to bubble which in turn results in poor tire uniformity and balance issues. Accordingly, there is a continuing need for a better technique for manufacturing high quality puncture-sealing pneumatic tires by a simple, low cost method that can be easily implemented on a commercial basis.

The noise generated by tires during use on a vehicle has been a matter of concern for decades. U.S. Pat. No. 4,327,792 explains that as a tire travels upon a surface, there occurs a movement of air, creating an audible sound. For any given tread pattern, a certain amount of energy is produced. While two different tread patterns may produce the same amount of quantum energy, the noise produced by each may be perceived dramatically differently by people. For instance, one tire may sound harsh and disagreeable and the other being quite acceptable. The difference between the two sounds is in their frequency spectrum or degree of tonality. Tonality is the condition wherein the sound generated is dominated by a single frequency and its harmonies, i.e., a majority of the sound generated being concentrated into a very small frequency range of the sound spectrum. Tonality is psychologically upsetting to a listener, creating an uneasy feeling. In addition to being irritating and unpleasant, tonal sounds can be perceived at greater distances and require more soundproofing material than do non-tonal sounds.

U.S. Pat. No. 4,327,792 explains that if a given concentration of sound energy could be spread out over a wider range of frequency, it would reduce the tonality or undesirability of the sound. This patent goes on to explain that various methods have been suggested to reduce objectionable noise generated by tires by spreading the energy produced over a wider frequency range. This is done by modulating the event frequency or characteristic frequency by varying the design cycle length about the tire (also known as pitching). However, these methods ignore the potential tonality in the low frequency range which may result from the pitching itself. As the distance between the repeating design cycles are varied, it is possible to produce an objectionable low frequency sound, which may take the form of a low frequency flutter. This low frequency pitching tonality is readily transmitted to the vehicle and depending upon the vehicle may produce objectionable noise or vibrations.

U.S. Pat. No. 4,327,792 more specifically discloses a tire provided with a tread having a plurality of load supporting elements placed about the circumference of said tire, said tread comprising: a plurality of repeating design cycles placed continuously about the circumference of said tire, said design cycles having at least two different pitch lengths and arranged about said tread so as to provide a plurality of not less than three harmonic segments, the design cycle lengths in each of said harmonic segments having a different period, the rounded fractional portions of the circumference represented by the different periods of the three harmonic segments corresponding to three different terms of the group consisting of the first nine terms of the harmonic series, each of said harmonic segment periods corresponding to a different frequency in the sound spectrum. This patent further reveals a tire provided with a tread having a plurality of load supporting elements placed about the circumference of said tire, said tread comprising: a plurality of repeating design cycles placed continuously about the circumference of said tie, said design cycles having at least two different pitch lengths and arranged about said tread so as to provide a plurality of not less than three harmonic segments, the design cycle lengths in each said harmonic segment having a different period, the relative difference between the largest and second largest of said three periods being at least as great as the relative difference between the seventh and eighth terms of the harmonic series and the relative difference between the second largest and smallest of said three periods being at least as great as the relative difference between the eighth and ninth terms of the harmonic series, the sum of said three periods occupying at least one-half of the circumference of the tire, each of said three harmonic segment periods corresponding to a different frequency in the sound spectrum, the remainder of the circumference unoccupied by said three segments comprising additional design cycle lengths having a plurality of additional periods each smaller than the periods of said three segments, the sum of any of the additional periods which are substantially identical being less than the period of the smallest of said three harmonic segments.

U.S. Pat. No. 7,387,141 discloses a low noise pneumatic tire, wherein a band-shaped sound absorbing material formed of a porous material whose apparent density defined in JIS K6400 is in a range of 10 to 70 kg/m$^3$ is attached to the inner surface of a tread by use of an elastic fixing band, wherein the elastic fixing band is arranged in an annular form along an inner peripheral surface of the band-shaped sound absorbing material and is retained on the inner surface of the tread under pressure through the elastic force of the elastic fixing band. This patent further reveals a low noise pneumatic tire, wherein a band-shaped sound absorbing material formed of a porous material whose apparent density defined in JIS K6400 is in a range of 10 to 70 kg/m$^3$ is attached to the inner surface of a tread by use of an elastic fixing band, wherein the elastic fixing band has a stretching mechanism, which automatically adjusts a circumferential length of the elastic fixing band, in at least one location on the circumference of the elastic fixing band.

U.S. Pat. No. 7,581,577 reveals a low noise pneumatic tire having a tread, the tread having a radially inner surface, a belt-shaped sound absorbing member being mounted on the radially inner surface of the tread by an annular fixing elastic band, the belt-shaped sound absorbing member being formed of a porous material and having a width of 40% to 90% of a maximum width of the tire and a thickness of 5 mm to 50 mm, whereby the elastic force of the elastic band secures the sound absorbing member on the inner surface of the tread, wherein the belt-shaped sound absorbing member has a radially inner surface and a radially outer surface, at least one of the radially inner and outer surfaces of the belt-shaped sound absorbing member has notches that extend widthwise of the belt-shaped sound absorbing member and are disposed at prescribed intervals longitudinally of the belt-shaped sound absorbing member, and wherein one of the radially inner and outer surfaces has the widthwisely extending notches, and the other of the radially inner and outer surfaces has longitudinally extending notches.

U.S. Pat. No. 7,735,532 discloses a low noise pneumatic tire according to claim 1, wherein said strip-shaped sound absorbent is installed onto the entire circumference of the inner surface of the tread of the tire taking advantage of the elastic force of the annular elastic fixing band, the strip-shaped sound absorbent having the mixed composition of a sound absorbing portion formed of a first porous material whose sound absorbing coefficient at a frequency of 200 Hz is not less than 20%, another sound absorbing portion formed of a second porous material whose sound absorbing coefficient at a frequency of 1 kHz is not less than 25%, and still another sound absorbing portion formed of a third porous material whose sound absorbing coefficient at a frequency of 1.5 kHz is not less than 30%.

U.S. Pat. No. 7,874,329 describes a low noise pneumatic tire comprising a plurality of noise absorbing members of a porous material, which are attached on the inner peripheral surface of the tire to be disposed with intervals in the tire circumferential direction, wherein the number of the noise absorbing members is from 5 to 50, the total length obtained by integrating the lengths of the noise absorbing members in the tire circumferential direction is not less than 75% of the tire maximum inner peripheral length, and the distance between each adjacent two of the noise absorbing members is not less than the maximum thickness of the end portions of the noise absorbing members in the tire circumferential direction, while being not more than 15% of the tire maximum inner peripheral length, wherein the shape of each noise absorbing member in a plan view is a polygon in which all the inner angles are obtuse angles.

U.S. Pat. No. 7,886,788 reveals a pneumatic tire with a noise damper made of a spongelike multi-cellular material. This noise damper is divided into small dampers to improve the high-speed durability of the tire and the noise damper is provided with a water-impermeable outer coating to prevent water from infiltrating into the spongelike multi-cellular material during transportation and storage of the tire. U.S. Pat. No. 7,886,788 more specifically describes a pneumatic tire comprising a tread portion, a pair of sidewall portions, a pair of axially spaced bead portions, an annular tire hollow forming a closed tire cavity when the tire is mounted on a wheel rim, a plurality of noise dampers each made of a spongelike multi-cellular material and disposed in the tire hollow, the noise dampers secured to an inner surface of the tread portion to extend in the circumferential direction of the tire at axially different positions, and the total volume of the noise dampers being in a range of from 0.4 to 20% of a volume of the tire cavity, wherein the tread portion is provided with a plurality of circumferentially extending main grooves, and on the radially inside of each of the main grooves which has a width Wg at the tire outer surface, one of the noise dampers which has a width Ws in a range of from 1.0 to 4.0 times the width Wg is located so as to cover the width Wg of the main groove.

U.S. Pat. No. 8,136,560 reveals a tire noise reduction device attached to a tire comprising: at least one noise absorbing member which is made of a porous material and attached to an inner surface of a tire tread portion, wherein the noise absorbing member includes a plurality of continuous grooves arranged side by side in a tire circumferential direction in an outer peripheral surface of the noise absorbing member, each of the continuous grooves has an areal groove bottom and extends from one side surface to an opposite side surface of the noise absorbing member in a tire width direction so that one side can be seen through the continuous groove from the opposite side, a groove edge-to-edge distance between each adjacent two of the continuous grooves in the tire circumferential direction is 2 mm to 40 mm, and a largest see-through cross-sectional area of each of the continuous grooves is 20 mm$^2$ to 100 mm$^2$.

U.S. Pat. No. 8,567,464 discloses a low noise pneumatic tire, mounted on a rim, including: an inner peripheral surface of the tire forming a cavity in combination with the rim, and a noise absorbing member of a porous material which is attached to the inner peripheral surface of the tire, wherein a lubricant is applied to at least both end portions in the tire width direction on the inner peripheral surface of the noise absorbing member, and wherein no lubricant is present on the inner peripheral surface of the tire.

U.S. Pat. No. 10,245,901 reveals a cavity noise reduction tire comprising: a tread portion, a bead assembly being disposed at each side of the tread portion, and a sidewall portion for connecting the tread portion and the bead assembly; and a sound-absorbing material attached to an inner side of the tread portion of the tire, wherein a ratio of a cross-section area B of the sound-absorbing material with respect to a cross-section area (A+B) of a space formed by an inner surface of the tire ranges from 23% to 29%, a left-to-right width W1 of a lower end of the sound-absorbing material is 55% of a maximum left-to-right width SW of the tire, a left-to-right width W2 of an upper end of the sound-absorbing material is 50% of the maximum left-to-right width SW of the tire, the sound-absorbing material is formed of a porous polyurethane foam having an elasticity of not less than 20% as measured according to JIS K 6401, the sound-absorbing material has a tensile strength of 2.3 kgf/cm$^2$ or more, a density of 33 kg/m$^3$ to 45 kg/m$^3$ and an elongation percentage of 340% or more, thereby reducing a cavity noise and enhancing a low temperature durability, a vertical slope is formed at a lower portion of a side of the sound-absorbing material, and a slanted slope is formed extending from the vertical slope at an upper portion of the side of the sound-absorbing material such that W1 is longer than W2, and a plurality of grooves are formed on a top of the sound-absorbing material, each of the grooves extending in a direction parallel to a circumference of the tire, wherein each of the grooves is an arc shape having a radius determined by the following equation:

$$R=0.0005\times(W1)^2+0.0475\times W1.$$

U.S. Pat. No. 10,995,249 describes a tire with reduced cavity noise comprising: an adhesive agent layer applied to an inside of an inner liner; and a sound absorber layer attached to the adhesive agent layer, wherein the adhesive agent layer comprises a polyether containing alkoxysilane at both ends thereof, 2-(2'-hydroxy-5'-methylphenyl)benzotriazole as a benzotriazole-based UV absorber presenting in an amount of 1 to 5 parts by weight, and a plasticizer presenting in an amount of 55 to 65 parts by weight, with respect to 100 parts by weight of the polyether containing alkoxysilane at both ends thereof, wherein the sound absorber layer comprises polyurethane foam which is based on polyurethane having open cells; and an adhesion promoter presenting in an amount of 5 parts by weight, with respect to 100 parts by weight of the polyether containing alkoxysilane at both ends thereof.

SUMMARY OF THE INVENTION

The pneumatic tires of this invention are of the tubeless type, are capable of self-sealing punctures made therein, and generate a low level of noise during use on a vehicle. These tires have a sealant/noise reduction layer which is disposed inwardly from the supporting carcass and which is typically the innermost layer of the tire. The sealant/noise reduction layer is comprised of a dispersed phase and a continuous phase, wherein the dispersed phase is comprised of a sealant material, and wherein the continuous phase is comprised of a foamed polymeric material. In one scenario the tire is further comprised of an innerliner, wherein the innerliner is disposed inwardly from the supporting carcass and outwardly from the sealant/noise reduction layer. In another embodiment of this invention the foamed polymeric material has good gas barrier properties which make it possible to eliminate the need for the tire to have conventional innerliner layer.

The self-sealing, low noise tires of this invention are manufactured using a novel technique that takes advantage of off-gassing that typically occurs during the breakdown of materials, such as butyl rubbers, which are used to form the sealant layer. In conventional tire manufacturing techniques off-gassing frequently leads to quality issues. For instance, the gasses generated can cause the tire innerliner layer to bubble and in some cases even to break. In any case, in conventional tire manufacturing procedures a high level of off-gassing can lead to quality issues and to tire defects. However, in manufacturing tires in accordance with this invention the gasses generated during vulcanization and polymeric breakdown are used advantageously to foam the sealant/noise reduction layer. More specifically, the sealant/noise reduction layer is comprised of the sealant material which is present as a dispersed phase within a continuous phase of a foamed elastomeric material. In other words, the gasses generated during the polymeric breakdown used in making the sealant material act to foam the elastomeric material of the continuous phase.

High quality tires of excellent consistency can be made using the techniques of this invention because innerlinners can be completely eliminated in cases where the continuous phase of the sealant/noise reduction layer is comprised of an elastomeric material having high gas barrier properties. In another embodiment of this invention an innerliner layer is included in the tire with it being situated inwardly from the supporting carcass and outwardly from the sealant/noise reduction layer. In this scenario quality issues do not arise since off-gassing will not cause the innerliner to bubble or distort since it is situated between the carcass and the sealant/noise reduction layer of the tire.

The present invention more specifically discloses a low noise, self-sealing, cured pneumatic tire which is comprised of a generally toroidal-shaped supporting carcass with an outer circumferential tread, two spaced beads, at least one ply extending from bead to bead, sidewalls extending radially from and connecting said tread to said beads, and a sealant/noise reduction layer which is disposed inwardly from the supporting carcass, wherein said circumferential tread is adapted to be ground-contacting, wherein the sealant/noise reduction layer is comprised of a dispersed phase and a continuous phase, wherein the dispersed phase is comprised of a sealant material, and wherein the continuous phase is comprised of a foamed polymeric material.

The subject invention further reveals a low noise, self-sealing, uncured pneumatic tire which is comprised of a generally toroidal-shaped supporting carcass with an outer circumferential tread, two spaced beads, at least one ply extending from bead to bead, sidewalls extending radially from and connecting said tread to said beads, and a sealant/noise reduction layer which is disposed inwardly from the supporting carcass, wherein said circumferential tread is adapted to be ground-contacting, wherein the sealant/noise reduction layer is comprised of a dispersed phase and a continuous phase, wherein the dispersed phase is comprised of a pre-sealant material which breaks down at tire vulcanization temperatures to produce a sealant material, and wherein the continuous phase is comprised of an elastomeric composition that foams during vulcanization.

The present invention also describes a method of manufacturing a low noise, self-sealing, pneumatic rubber tire which comprises: (1) building an unvulcanized tire which is comprised of a generally toroidal-shaped supporting carcass with an outer circumferential tread, two spaced beads, at least one ply extending from bead to bead, sidewalls extending radially from and connecting said tread to said beads, and a sealant/noise reduction layer which is disposed inwardly from the supporting carcass, wherein said circumferential tread is adapted to be ground-contacting, wherein the sealant/noise reduction layer is comprised of a dispersed phase and a continuous phase, wherein the dispersed phase is comprised of a pre-sealant material which breaks down at tire vulcanization temperatures to produce a sealant material, and wherein the continuous phase is comprised of an elastomeric composition that foams during vulcanization; and (2) shaping and vulcanizing said tire in a tire mold and curing the unvulcanized tire under conditions of heat and pressure to produce the low noise, self-sealing, pneumatic rubber tire.

BRIEF DESCRIPTION OF THE DRAWINGS

The present invention is further illustrated by the accompanying drawing which illustrates one embodiment of this invention.

FIG. 1 is a cross-sectional view of a tire of this invention wherein an innerliner layer is sandwiched between the sealant/noise reduction layer and carcass of the tire.

DETAILED DESCRIPTION OF THE INVENTION

The self-sealing, low noise, pneumatic tires of this invention include a sealant/noise reduction layer as the innermost layer of the tire. In cases where the sealant/noise reduction layer has a continuous phase which is comprised of an elastomeric material having good gas barrier properties, such as a halobutyl rubber, it is possible and it is generally preferably to totally eliminate a conventional innerliner layer from the tire. In another embodiment of this invention a conventional innerliner layer can be included with it being situated inwardly from the supporting carcass and outwardly from the sealant/noise reduction layer. In other words, the innerliner layer is sandwiched between the carcass and the sealant/noise reduction layer as illustrated in FIG. 1. The innerliner is an air barrier layer that serves to keep air or another gas, such as nitrogen, which is used to inflate the tire for escaping through the tire structure by diffusion. The innerliner is typically comprised of a halobutyl rubber, such as chlorobutyl rubber or bromobutyl rubber, or some other suitable material having a high degree of resistance to gas permeation. In some cases, such as in certain agricultural tires and heavy equipment tires, a relatively thick layer of natural rubber can be used as an innerliner.

In FIG. 1 a self-sealing pneumatic rubber tire 2 of this invention is shown wherein the tire has sidewalls 3, a supporting carcass 4, inextensible beads 5, an innerliner (air barrier layer) 7, a sealant/noise reduction layer 6, and an outer circumferential tread (tread portion) 8. The individual sidewalls 3 extend radially inward from the axial outer edges of the tread portion 8 to join the respective inextensible beads 5. The supporting carcass 4 acts as a supporting structure for the tread portion 8 and sidewalls 3. The sealant layer/noise reduction layer 6 is disposed inwardly from the innerliner 7. In this embodiment of the invention the innerliner 7 is positioned outwardly from the supporting carcass 4 and inwardly from the sealant/noise reduction layer. In any case, the outer circumferential tread 8 is adapted to be ground contacting when the tire is in use.

In another embodiment of this invention where the continuous phase of the sealant/noise reduction layer is comprised of an elastomer having good gas barrier properties, such as a halobutyl rubber, the innerliner 7 can be totally eliminated from the tire. In this scenario the sealant/noise reduction layer 6 is situated inwardly from the supporting carcass. In any case, the sealant/noise reduction layer 6 will typically be the innermost layer of the tire.

In yet another embodiment of this invention, the sealant/noise reduction layer 6 is situated inwardly from the supporting carcass including the innerliner 7. An additional layer of an elastomeric compound can be placed inwardly from the sealant/noise reduction layer, as a cover layer or to function as an additional innerliner.

In accordance with this invention, a sealant/noise reduction layer is built into an unvulcanized rubber tire. This is accomplished by building into the uncured tire as its innermost layer a material which is comprised of a dispersed phase and a continuous phase. The dispersed phase is comprised of a solid pre-sealant material and the continuous phase is comprised of a relatively stiff elastomeric material which makes it relatively easy to build this layer into the tire.

After an unvulcanized tire is built so as to include a layer of the pre-sealant/pre-foamed elastomer formulation it is vulcanized utilizing conventional techniques. More specifically, after the unvulcanized pneumatic rubber tires of this invention are assembled, they are vulcanized using a normal tire cure cycle. In the practice of this invention the unvulcanized tires can be cured over a wide temperature range, such as a temperature which is within the range of about 100° C. to about 200° C. However, it is generally preferred for the tires of this invention to be cured at a temperature ranging from about 130° C. to about 170° C. It is typically more preferred for the tires of this invention to reach a maximum temperature ranging from a 140° C. to 165° C. during vulcanization. For instance, it is typically optimal for the tire to reach a maximum curing temperature which is within the range of 160° C. to 165° C. It is generally preferable for the cure cycle used to vulcanize the uncured tires to have a duration which is within the range of about 4 minutes to about 240 minutes. In the practice of this invention the uncured tires with normally be cured for a period which is within the range of about 10 minutes to 25 minutes with the cure period preferably being from about 10 minutes to 17 minutes, and most preferably being within the range of about 11 minutes to 13 minutes. Any standard vulcanization process can be used such as heating in a press or mold and/or heating with superheated steam or hot air. In any case, the uncured tire can be built, shaped, molded and cured by various methods which are known and which are readily apparent to those having ordinary skill in the art.

The pre-sealant used in the practice of this invention can be any formulation which is known in the art to depolymerized under condition of tire vulcanization to form sealant material. It will typically be a solid butyl rubber which contains a peroxide in an amount which is sufficient to breakdown the butyl rubber at the elevated temperature used to vulcanize the tire to form the sealant composition. The pre-sealant composition can optionally contain rubbers in addition to butyl rubber, such as polyisobutylene. However, the pre-sealant composition will normally be void of other rubbers, such as polyisobutylene, halogenated butyl rubbers, natural rubber, synthetic polyisoprene rubber, emulsion styrene-butadiene rubber, solution styrene-butadiene rubber, isoprene-butadiene rubber, styrene-isoprene-butadiene rubber, styrene/butadiene diblock polymers, styrene/butadiene/styrene triblock polymers, neoprene, nitrile rubber, ethylene-propylene rubbers, and ethylene-propylene-diene monomer rubbers.

A reinforcing filler can optionally be included in the pre-sealant formulation. A wide variety of reinforcing fillers can be used. For example, the filler can be carbon black, graphite, graphene, carbon nanotubes, wollastonite, silica, crystalline silica, clay, 2:1 layered silicate clays, talc, diatomaceous earth, calcium carbonate ($CaCO_3$), calcium silicate, starch, lignin, alumina, or polypropylene. The 2:1 layered silicate clays that are typically preferred include montmorillonite, bentonite, hectorite, saponite, nontronite, beidellite, fluorohectorite, stevensite, volkonskoite, sauconite laponite, related analogs thereof and their physical blends. Clays that have been chemically modified to make them compatible with organic materials are preferred and are generally referred to as "organophilic" clays or "organoclays". The basic starting material used to make organophilic clay is an exchangeable clay of the smectite group and can include montmorillonite (commonly known and mined as bentonite), hectorite, saponite, attapulgite and sepolite. These clays include exchangeable cationic species such as sodium, potassium or calcium ions on their surface and between clay galleries or layers. In the course of manufacturing an organophilic clay, at least a portion of these exchangeable cationic species are substituted by an organic cation such as a quaternary amine, an organophosphorus ion, any other ion of the type known in the art as an onium ion, or the like.

The graphene that can be used in the solid pre-sealant layer formulations of this invention is a one-atom-thick crystalline form of carbon in which carbon atoms are held together by sigma bonds that are arranged in a two-dimensional honeycomb lattice. More specifically graphene is a crystalline allotrope of carbon with 2-dimensional properties. The carbon atoms in graphene are densely packed in a regular atomic-scale hexagonal (chicken wire) pattern. Each atom has four bonds, one σ bond with each of its three neighbors and one Π-bond that is oriented out of plane. The distance between adjacent carbon atoms in graphene is approximately 0.142 nanometers. The graphene that can be advantageously used as a reinforcing filler in the practice of this invention can have zig-zag, armchair, K-region, gulf, bay, cove, and fjord edge topologies. Typically, at least 50 percent, 60 percent, 70 percent, or 80 percent of the carbon-carbon bonds on the edges of the graphene structure will be in the zig-zag configuration, the armchair configuration, or the bay configuration. In many cases, at least 40 percent, 50 percent, or 60 percent of the carbon-carbon bonds on the edges of the graphene structure will be in the zig-zag configuration. In one embodiment at least 40 percent, 50 percent, or 60 percent of the carbon-carbon bonds on the edges of the graphene structure will be in the armchair configuration. In another embodiment at least 40 percent, 50 percent, or 60 percent of the carbon-carbon bonds on the edges of the graphene structure will be in the bay configuration. Typically, less than 40 percent of the carbon-carbon bonds on the edges of the graphene structure will be in the cove configuration and more typically less than 30 percent of the carbon-carbon bonds on the edges of the graphene structure will be in the cove configuration. In another embodiment less than 40 percent of the carbon-carbon bonds on the edges of the graphene structure will be in the cove configuration and less than 30 percent or more typically less than 20 percent of the carbon-carbon bonds on the edges of the graphene structure will be in the fjord configuration.

The graphene that can optionally be used as a reinforcing filler in the practice of this invention is exfoliated into nano-scaled graphene plate (NGP) material that is essentially comprised of individual single sheets of graphene or a plurality of sheets of graphite planes. Each graphite plane, also referred to as a graphene plane or basal plane, is comprised of a two-dimensional hexagonal structure of carbon atoms. Each plane has a length and a width parallel to the graphite plane and a thickness orthogonal to the graphite plane characterized in that at least one of the values of length, width, and thickness is 100 nanometers (nm) or smaller. Preferably, all length, width and thickness values are smaller than 100 nm. This NGP material can be produced by a process the method described in U.S. Pat. No. 7,071,258 which comprising the steps of: (a) carbonization or graphitization to produce a polymeric carbon, (b) exfoliation or expansion of graphite crystallites in the polymeric carbon to delaminate or separate graphene planes, and (c) mechanical attrition of the exfoliated structure to nanometer-scaled plates. The teachings of U.S. Pat. No. 7,071,258 are incorporated herein by references for the purpose or describing graphene that can be utilized in the practice of this invention and methods for manufacturing such graphene. In the practice of this invention it is preferred for the graphene to be comprised of individual single sheets of graphene (single graphene planes or single basal planes).

The reinforcing filler is typically included at a level which is within the range of about 1 phr to about 75 phr and is more typically included at a level which is within the range of 5 phr to 50 phr. The reinforcing filler is normally included at a level which is within the range of about 10 phr to about 45 phr, is preferably included at a level which is within the range of 20 phr to 40 phr, and is more preferably included at a level which is within the range of 30 phr to 38 phr. In cases where polypropylene is utilized as a filler lower levels are required since it has been found to be highly effective. More specifically, in cases where polypropylene is used as a filler about 35 percent to 40 percent less material is required than is the case with conventional fillers, such as carbon black and mineral fillers. The use of polypropylene as a filler also offers an additional advantage in that it breaks down during the curing of the tire to work in conjunction with the polyisobutylene rubber as a sealant. In other words, polypropylene offers a unique advantage in that it acts both as a filler in building the tire and subsequently as a sealant in the cured tire. Low molecular weight polypropylene is preferred for use as a filler in the practice of this invention. Such low molecular weight polypropylene typically has a weight average molecular weight ($M_w$) which is within the range of about 4,000 to about 40,000. The low molecular weight polypropylene will normally have a weight average molecular weight which is within the range of 6,000 to 25,000, will preferably have a weight average molecular weight which is within the range of 8,000 to 20,000, and will most preferably have a weight average molecular weight which is within the range of 10,000 to 15,000. It should also be noted that polypropylene can also be beneficially utilized in conventional butyl rubber based sealant formulations that include typically compounding ingredients as described herein.

The sealant layer formulation used in the practice of this invention can optionally include one or more processing oils. A wide variety of processing oils can be used. Suitable processing oils may include various oils as are known in the art, including aromatic, paraffinic, naphthenic, triglyceride oils, and low PCA oils, such as MES, TDAE, SRAE and heavy naphthenic oils. Suitable low PCA oils may include those having a polycyclic aromatic content of less than 3 percent by weight as determined by the IP346 method. Procedures for the IP346 method may be found in Standard Methods for Analysis & Testing of Petroleum and Related Products and British Standard 2000 Parts, 2003, 62nd edition, published by the Institute of Petroleum, United Kingdom. The triglyceride oils that can be used include vegetable oils, including but not limited to vegetable oils, soybean oil, canola oil (Rapeseed oil), corn oil, cottonseed oil, olive oil, palm oil, safflower oil, sunflower oil, coconut oil, and peanut oil. Castor oil, soybean oil, and corn oil are preferred oils for use in the solid sealant layer formulations of this invention. Castor oil is a triglyceride oil that contains approximately 87 percent ricinoleic acid, 7 percent oleic acid, 3 percent linoleic acid, 2 percent palmitic acid, and 1 percent stearic acid. The processing oil will typically be employed at a level which is within the range of about 1 phr to about 20 phr and will more typically be employed at a level which is within the range of 1 phr to 10 phr. In most cases the processing oil will be included at a level which is within the range of about 2 phr to about 5 phr and will preferably be employed at a level which is within the range of 2 phr to 4 phr.

Various pigments or colorants can also optionally be included in the sealant formulations of this invention. By including one or more pigments or colorants in the sealant formulation the fact that the tire has in fact been punctured and the location of puncture can more readily be identified. A wide variety of colors can be used for this purpose with lights colors which stand out from the characteristic black color of tire treads being preferred. For example, white, red, orange, yellow, green, or blue pigments or colorants can optionally be included. Titanium dioxide can be utilized to impart a brilliant white color, red iron pigment can be used to impart a brilliant red color, or pigment yellow 12 can be used to impart a brilliant yellow color. The pigment or colorant will typically be utilized in a quantity that will make punctures in the tire more readily apparent and will normally be used at a level which is within the range about 1 phr to about 5 phr, and will preferably be used at a level which is within the range of 2 phr to 4 phr.

Both organic and inorganic pigments can be utilized. In most cases the pigment or colorant will be of a white, red, orange, yellow, green, or blue color. Some representative examples of pigments that can be utilized include, but are not limited to, Pigment Yellow 1 (CAS No. 2512-29-0), Pigment Yellow 110 (CAS No. 5590-18-1), Pigment Yellow 12 (CAS No. 15541-56-7), Pigment Yellow 126 (CAS No. 90268-23-8), Pigment Yellow 127 (CAS No. 68610-86-6), Pigment Yellow 13 (CAS No. 5102-83-0), Pigment Yellow 138 (CAS No. 30125-47-4), Pigment Yellow 14 (CAS No. 5468-75-7), Pigment Yellow 150 (CAS No. 68511-62-6), Pigment Yellow 151 (CAS No. 31837-42-0), Pigment Yellow 154 (CAS No. 68134-22-5), Pigment Yellow 168 (CAS No. 71832-85-4), Pigment Yellow 17 (CAS No. 4531-49-1), Pigment Yellow 174 (CAS No. 78952-72-4), Pigment Yellow 180 (CAS No. 77804-81-0), Pigment Yellow 183 (CAS No. 65212-77-3), Pigment Yellow 191 (CAS No. 129423-54-7), Pigment Yellow 3 (CAS No. 6486-23-3), Pigment Yellow 34 (CAS No. 1344-37-2), Pigment Yellow 42 (CAS No. 51274-00-1), Pigment Yellow 65 (CAS No. 6528-34-3), Pigment Yellow 74 (CAS No. 6358-31-2), Pigment Yellow 75 (CAS No. 52320-66-8), Pigment Yellow 81 (CAS No. 22094-93-5), Pigment Yellow 83 (CAS No. 5567-15-7), C.I. Pigment Yellow 42 (iron oxide), C.I. Pigment Yellow 34 (lead chromates), C.I. Pigment Yellow 184 (bismuth vanadates), C.I. Pigment Yellow 53 (nickel antimony), C.I. Pigment Orange 20 (cadmium sulfide), C.I. Pigment Red 101 (iron oxide), C.I. Pigment Red 104, C.I. Pigment Red 29 (ultramarine pigment), C.I. Pigment Blue 29 (ultramarine pigment), C.I. Pigment Blue 28, C.I. Pigment Blue 36, C.I. Pigment Violet 15 (ultramarine pigment), C.I. Pigment Violet 16 (manganese violet), Pigment Green 17 (chrome oxide green), C.I. Pigment Green 19 (cobalt-based mixed metal oxides), C.I. Pigment Green 26 (cobalt-based mixed metal oxides), and C.I. Pigment Green 50 (cobalt-based mixed metal oxides).

Some additional inorganic pigments that can be used include Ultramarine blue, Persian blue, Cobalt blue (CAS No. 1345-16-0), Curlean blue, Egyptian blue, Han blue ($BaCuSi_4O_{10}$), Azurite blue ($Cu_3(CO_3)_2(OH)_2$, Prussian blue (CAS No. 14038-43-8), YInMn blue (Oregon blue), Realgar red ($\alpha$-$As_4S_4$), cadmium red ($Cd_2SSe$), Cerium sulfide red, Venetian red ($Fe_2O_3$), Red Ochre (anhydrous $Fe_2O_3$), Burnt sienna red, Red lead ($Pb_3O_4$), Vermilian red, Cinnabar red, Ultramarine violet, Han purple ($BaCuSi_2O_6$), Cobalt violet ($CO_3(PO_4)_2$), Manganese violet ($NH_4MnP_2O_7$), Purple of Cassius, Primrose yellow ($BiVO_4$), Cadmium yellow (CdS), Chrome yellow ($PbCrO_4$), Aureolin yellow ($K_3Co(NO_2)_6$), Yellow Ochre ($Fe_2O_3 \cdot H_2O$), Naples yellow, Titanium yellow ($NiO \cdot Sb_2O_3 \cdot 20TiO_2$), Zinc yellow ($ZnCrO_4$), and Chrome orange ($PbCrO_4PbO$).

Polyethylene glycol can also optionally be included in the sealant formulations of this invention. The polyethylene glycol will typically have a molecular weight which is within the range of 500 to 12,000 and will more typically have a molecular weight which is within the range of 4,000 to 8,000. In cases where polyethylene glycol is utilized it will typically be included at a level which is within the range of about 0.1 phr to about 2 phr, preferably 0.2 phr to 1 phr, and most preferably 0.3 phr to 0.7 phr.

The peroxide which will be included in the pre-sealant formulation will typically be one of those generally used for the crosslinkage of rubbery polymers. Preferably peroxide compounds which disintegrate only at high temperatures, above about 100° C. are utilized. Some representative examples of such peroxides include tert-butyl perbenzoate and dialkyl peroxides with the same or different radicals, such as dialkylbenzene peroxides and alkyl peresters. Preferably the peroxide vulcanizing agent employed will contain two peroxide groups. Frequently the peroxide groups are attached to a tertiary-butyl group. The basic moiety on which the two peroxide groups are suspended can be aliphatic, cycloaliphatic, or aromatic radicals. Some representative examples of such peroxide include: bis($\alpha,\alpha$-dimethylbenzyl) peroxide (more commonly known as dicumyl peroxide); 2,5-bis(t-butyl peroxy)-2,5-dimethyl hexane; 1,1-di-t-butyl peroxy-3,3,5-trimethyl cyclohexane; 2,5-dimethyl-2,5-di(t-butyl peroxy) hexyne-3; p-chlorobenzyl peroxide; 2,4-dichlorobenzyl peroxide; 2,2-bis-(t-butyl peroxy)-butane; di-t-butyl peroxide; benzyl peroxide; 2,5-bis(t-butyl peroxy)-2,5-dimethyl hexane; and 2,5-dimethyl-2,5-di(t-butyl peroxy) hexane. Such peroxide vulcanizing agents can be added to the polymer composition layer in pure form (100 percent active peroxide), but are typically employed on an inert, free-flowing mineral carrier or an oil, such as silicon oil. Calcium carbonate is an inert mineral carrier which is frequently utilized for this purpose. Such peroxide carrier compositions normally containing from about 30 to 55 weight percent active peroxide and typically contain from 35 to 50 weight percent active peroxide. For instance, the peroxide carrier composition can contain from about 38 to about 43 weight percent active peroxide, such as dicumyl peroxide, on a mineral carrier, such as calcium carbonate. The peroxide will normally be included in the solid sealant layer formulation used in the practice of this invention at a level which is within the range of 0.5 phr to 7 phr (based upon active peroxide) and will typically be present at a level which is within the range of 2.5 phr to 5 phr. It is preferred for the peroxide to be present at a level which is within the range of 3 phr to 4.2 phr and is more preferably included at a level which is within the range of 3.5 phr to 4 phr. The term "phr" stands for parts by weight per 100 parts by weight of rubber.

The elastomeric material that is utilized as the continuous phase of the sealant/noise reduction layer can be selected from a wide variety of materials. However, it should be capable of being blown into a foam under the pressure and at the temperature used to vulcanize (cure) the tire. Additionally, the material must not interfere with the function of the surrounding tire components. As has previously been explained, it is preferable for elastomeric material used as the continuous phase of the sealant/noise reduction layer to have good gas barrier properties. Accordingly, it is preferred for this elastomer to be a halobutyl rubber, such as a chlorobutyl rubber or a bromobutyl rubber. In some cases, it can be desirable to use natural rubber in this capacity.

Variations in the present invention are possible in light of the description of it provided herein. The illustrations and corresponding descriptions are not intended to restrict or limit the scope of the appended claims in any way. While certain representative embodiments and details have been shown for the purpose of illustrating the subject invention, it will be apparent to those skilled in this art that various changes and modifications can be made therein without departing from the scope of the subject invention. It is, therefore, to be understood that changes can be made in the particular embodiments described which will be within the full intended scope of the invention as defined by the following appended claims.

What is claimed is:

1. A low noise, self-sealing, uncured pneumatic tire which is comprised of a generally toroidal-shaped supporting carcass with an outer circumferential tread, two spaced beads, at least one ply extending from bead to bead, sidewalls extending radially from and connecting said tread to said beads, and a sealant/noise reduction layer which is disposed inwardly from the supporting carcass and is the innermost layer of the tire, wherein said circumferential tread is adapted to be ground-contacting, wherein the uncured pneumatic tire is void of an innerliner, wherein the sealant/noise reduction layer is comprised of a dispersed phase and a continuous phase, wherein the dispersed phase is comprised of a butyl rubber as a pre-sealant material which breaks down at tire vulcanization temperatures to produce a sealant material, wherein the dispersed phase is further comprised of from 0.5 phr to 7 phr of a peroxide based upon active peroxide, and wherein the continuous phase is comprised of a halobutyl rubber that foams during vulcanization.

2. The low noise, self-sealing, uncured pneumatic tire as specified in claim 1 wherein the pre-sealant layer is further comprised of a reinforcing filler.

3. The low noise, self-sealing, uncured pneumatic tire as specified in claim 2 wherein the pre-sealant layer is further comprised of a plasticizer.

4. The low noise, self-sealing, uncured pneumatic tire as specified in claim 3 wherein said plasticizer is a processing oil.

5. The low noise, self-sealing, uncured pneumatic tire as specified in claim 4 wherein the pre-sealant composition is further comprised of polyethylene glycol.

6. The low noise, self-sealing, uncured pneumatic tire as specified in claim 1 wherein the pre-sealant composition is further comprised of a red, orange, yellow, green, or blue pigment or colorant.

7. The low noise, self-sealing, uncured pneumatic tire as specified in claim 1 wherein the dispersed phase is void of polyisobutylene.

8. The low noise, self-sealing, uncured pneumatic tire as specified in claim 1 wherein the dispersed phase is void of rubbers other than the butyl rubber.

9. A method of manufacturing a low noise, self-sealing, pneumatic rubber tire which comprises: (1) building an unvulcanized tire which is comprised of a generally toroidal-shaped supporting carcass with an outer circumferential tread, two spaced beads, at least one ply extending from bead to bead, sidewalls extending radially from and connecting said tread to said beads, and a sealant/noise reduction layer which is disposed inwardly from the supporting carcass, wherein said circumferential tread is adapted to be ground-contacting, wherein the uncured pneumatic tire is void of an innerliner, wherein the sealant/noise reduction layer is comprised of a dispersed phase and a continuous phase, wherein the dispersed phase is comprised of a butyl rubber as a pre-sealant material which breaks down at tire vulcanization temperatures to produce a sealant material and from 0.5 phr to 7 phr of a peroxide based upon active peroxide, and wherein the continuous phase is comprised of a halobutyl rubber that foams during vulcanization; and (2) shaping and vulcanizing said tire in a tire mold and curing the unvulcanized tire under conditions of heat and pressure to produce the low noise, self-sealing, pneumatic rubber tire.

10. The method as specified in claim 9 wherein the foamed polymeric material is sulfur curable and co-cures with the adjoining tire components during tire vulcanization.

11. The method as specified in claim 9 wherein the dispersed phase is void of polyisobutylene.

12. The method as specified in claim 9 wherein the dispersed phase is void of rubbers other than the butyl rubber.

13. A low noise, self-sealing, cured pneumatic tire which is comprised of a generally toroidal-shaped supporting carcass with an outer circumferential tread, two spaced beads, at least one ply extending from bead to bead, sidewalls extending radially from and connecting said tread to said beads, and a sealant/noise reduction layer which is disposed inwardly from the supporting carcass and is the innermost layer of the tire, wherein said circumferential tread is adapted to be ground-contacting, wherein the cured pneumatic tire is void of an innerliner, wherein the sealant/noise reduction layer is comprised of a dispersed phase and a continuous phase, wherein the dispersed phase is comprised of a butyl rubber as a sealant material, and wherein the continuous phase is comprised of a foamed halobutyl rubber, wherein the dispersed phase is void of polyisobutylene.

14. A low noise, self-sealing, cured pneumatic tire which is comprised of a generally toroidal-shaped supporting carcass with an outer circumferential tread, two spaced beads, at least one ply extending from bead to bead, sidewalls extending radially from and connecting said tread to said beads, and a sealant/noise reduction layer which is disposed inwardly from the supporting carcass and is the innermost layer of the tire, wherein said circumferential tread is adapted to be ground-contacting, wherein the cured pneumatic tire is void of an innerliner, wherein the sealant/noise reduction layer is comprised of a dispersed phase and a continuous phase, wherein the dispersed phase is comprised of a butyl rubber as a sealant material, and wherein the continuous phase is comprised of a foamed halobutyl rubber, wherein the dispersed phase is further comprised of 5 phr to 50 phr of graphene.

15. The low noise, self-sealing, cured pneumatic tire as specified in claim 14 wherein the graphene has a structure with at least 50 percent of the carbon-carbon double bonds on the edges of the graphene structure being of a zig-zag configuration.

16. The low noise, self-sealing, cured pneumatic tire as specified in claim 15 wherein the graphene has a structure with less than 20 percent of the carbon-carbon double bonds on the edges of the graphene structure being in a fjord configuration.

17. The low noise, self-sealing, cured pneumatic tire as specified in claim 15 wherein the graphene has a structure with less 30 percent of the carbon-carbon bonds on the edges of the graphene structure being in the cove configuration.

18. The low noise, self-sealing, cured pneumatic tire as specified in claim 14 wherein the graphene has a structure with at least 50 percent of the carbon-carbon double bonds on the edges of the graphene structure being of an armchair configuration.

* * * * *